United States Patent [19]
Auld et al.

[11] Patent Number: 5,231,665
[45] Date of Patent: Jul. 27, 1993

[54] CABLE TELEVISION SYSTEM HAVING DYNAMIC MARKET CODE SHUFFLING

[75] Inventors: Frederick H. Auld, Barrington; Caitlin B. Bestler, Chicago; Richard G. Merrell, Hebron, all of Ill.; Rueen-Guang Shyu, Lawrenceville, Ga.

[73] Assignee: Zenith Electronics Corporation, Glenview, Ill.

[21] Appl. No.: 795,414

[22] Filed: Nov. 20, 1991

[51] Int. Cl.$^5$ .............................................. H04N 7/16
[52] U.S. Cl. ...................................... 380/20; 383/23; 358/86
[58] Field of Search ....................... 380/20, 23; 358/86

[56] References Cited

U.S. PATENT DOCUMENTS

| | | | |
|---|---|---|---|
| 4,514,761 | 4/1985 | Merrel et al. | 380/20 |
| 4,554,579 | 11/1985 | Citta | 358/86 |
| 4,685,131 | 8/1987 | Horne | 380/20 |
| 4,864,614 | 9/1989 | Crowther | 380/20 X |
| 5,036,537 | 7/1991 | Jeffers et al. | 380/20 |

*Primary Examiner*—Gilberto Barrón, Jr.

[57] ABSTRACT

A cable television system includes a headend unit having a plurality of program signal sources, encoders, scrambling circuits, and channel modulators for producing a plurality of program channels modulated at a corresponding plurality of cable system carrier frequencies. An address computer within the headend unit is operative upon the encoders to provide the insertion of a message packet within the vertical blanking interval of the program signals. The scrambler circuits render the program signal unviewable by conventional television receivers. A cable system decoder is coupled to the headend by a cable and includes a conventional tuner, intermediate frequency amplifier and detector. A decoder processor is coupled to a channel selection input and to the tuner to provide channel selection in accordance with a user input. The decoder processor examines the message packet during the vertical blanking interval to determine authorization of the decoder to display the received program channel. A descrambler is coupled to the processor and the tuner IF and detector to descramble the program signal if authorization is detected. A modulator modulates the descrambled signal upon a fixed channel carrier for application to a conventional television receiver.

20 Claims, 3 Drawing Sheets

CABLE TELEVISION SYSTEM HAVING DYNAMIC MARKET CODE SHUFFLING

FIELD OF THE INVENTION

This invention relates generally to cable television systems and particularly to the channel barkering systems used therein.

BACKGROUND OF THE INVENTION

Cable television systems provide a method of television signal distribution between a central facility generally referred to as the "headend", and a large number of television viewers through a cable distribution system. The headend includes the source of programming information together with a plurality of television channel modulators which provide a plurality of television program signals at different channel frequencies. The plurality of program channel signals are communicated to the individual television viewers via a network of cables, distribution equipment, and individual signal decoders at each user location. Early cable television systems were usually limited to one-way cable systems so named because all communication occurred from the headend down through the system to the individual decoders. Later developed systems provided communication capability in both directions between the headend and encoders and are thus referred to as two-way cable television systems. For purposes of convenience, communications and information transmission from the headend to the user decoders is generally referred to as "downstream" communication while the transmission of information and data from the user decoders to the headend of the system is referred to as "upstream" communication.

Downstream signals or communication typically include program information together with appropriate television scan synchronizing information plus additional data such as subscriber addresses or program authorization. This additional data is usually combined with the program information during the vertical blanking interval of the signal. Typical upstream signals or information may include program purchases or other relevant information such as responses to status inquiry or polling information requests.

In most cable television systems, the various program channels are grouped into basic service channels together with special optional channels which require additional service fees or payments to be received by the viewer. The latter are generally referred to as pay channels or programs and may be received and displayed solely by those decoders within the cable system which are authorized to view them. In virtually all cable television systems, the need for authorization to receive and display pay programming is enforced by the use of scrambled signals on pay channels. At the headend of the system, a signal scrambler is operative upon the program information to alter it in a manner rendering it virtually unviewable when applied unchanged to a television receiver. At the encoder, a corresponding descrambler is operative to unscramble the program information and return it to the proper television format for viewing on a conventional television receiver. The headend further includes an address computer and signal encoder which cooperate to insert the program authorization information for the pay per view channel within the vertical blanking interval. Correspondingly, the encoder includes systems for responding to the authorization information within the vertical blanking interval to activate the descrambler once the proper authorization signal is received.

When a cable television viewer attempts to receive a particular program channel, the encoder is tuned to the selected channel and the encoder determines whether the appropriate authorization code is present during the program signal vertical blanking interval. The presence of the appropriate authorization code indicates that the decoder is authorized to receive the pay program information and the descrambler is activated and the program information is properly displayed. If, however, the correct authorization code is not carried within the program signal, the decoder is not authorized to receive the pay per view program and the signal will not be descrambled. In some cable television systems, unauthorized pay programs are simply displayed in their scrambled form and are thus unviewable. In other systems, however, a viewer request for an unauthorized pay signal causes the decoder to be switched to an alternate channel which provides additional information to the viewer. Such alternate channels are generally referred to as "barker" channels and the process of automatically switching to such alternate channels is generally referred to as "barkering". In their simplest form, barker channels may simply display information to the viewer indicating that the viewer is not authorized to receive the selected program and may suggest that the viewer subscribe to the pay channel. More likely, however, the viewer is afforded the opportunity to obtain authorization immediately in a process often referred to as individual or impulse pay per view.

The information within the information packet inserted into the vertical blanking interval of the program signal in most cable television systems includes a decoder address or unique identifier for the particular decoder for which the communication is intended. In addition, some cable television systems provide a market code identifier which specifies a particular group of decoders from within the larger number of decoders in the system. The initial purpose for the use of such market code identifiers was to prevent the use of a viewer's decoder in another geographic or market area rather than the geographic or market area in which the cable system operator originally installed the decoder. In part, this provides some measure of theft prevention since the reuse of decoders in other areas is thwarted. It has also been found, however, that the use of market codes in addition to the decoder address system enables the cable operator to divide the cable system into a plurality of subgroups or units which may be handled individually or differently thereby increasing system flexibility. With these benefits available, the use of market coded cable systems has increased and, most likely, will continue.

While many present cable systems have been successful in providing a great number of program channels to the viewer, and have provided tiered systems using market codes, there remains a continuing need in the art for evermore flexible and improved cable television systems.

Accordingly, it is a general object of the present invention to provide an improved cable television system. It is a more particular object of the present invention to provide an improved cable television system which exhibits additional system flexibility and a multiple tiered capability.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
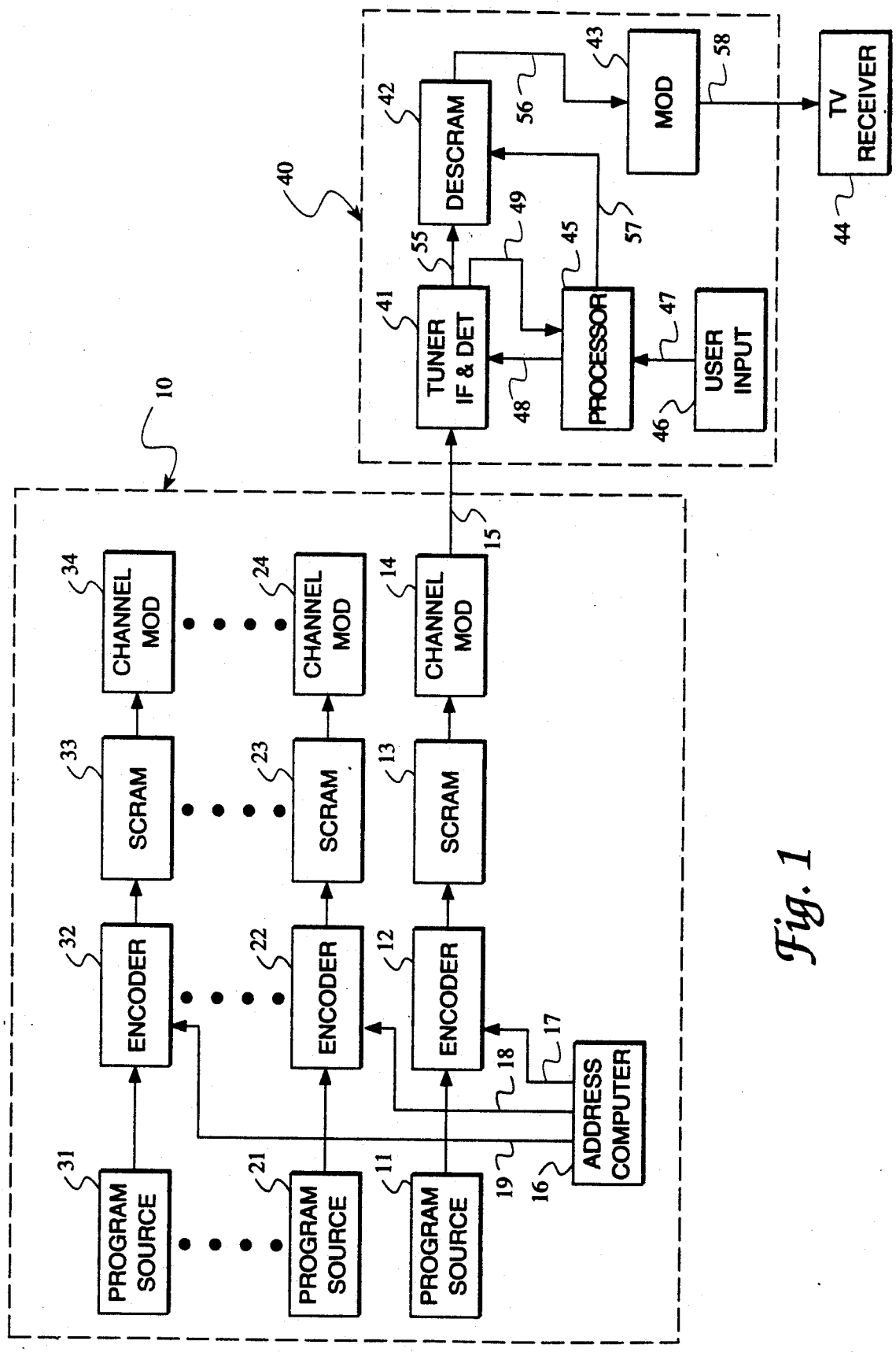
FIG. 1 sets forth a block diagram of a cable television system constructed in accordance with the present invention.

FIG. 1 sets forth a block diagram of a cable television system constructed in accordance with the present invention. The headend or master program source is shown within dashed line 10 while a single viewer decoder is shown within dashed line 40. Also shown is a television receiver 44 located at the viewer's location. A cable 15 is shown coupled between headend 10 and decoder 40. It will be recognized by those skilled in the art that a single decoder 40 is shown coupled to headend 10 by a simple cable 15 solely for purposes of illustration. It will also be recognized that, in practice, a great number of decoders which may be similar or identical to decoder 40 will be coupled to a single headend 10 through a complex distribution network in place of the simplified coupling of cable 15.

More specifically, headend 10 includes a program source 11 coupled to an encoder 12, the output of which is coupled to a channel modulator 14 through a scrambling circuit 13. Channel modulator 14 is coupled to cable output 15. An address computer 16 includes a communication line 17 coupled to encoder 12. A similar program source 21 is coupled to an encoder 22 which in turn is coupled to a channel modulator 24 by a scrambling circuit 23. The output of channel modulator 24 is also coupled to cable 15. Address computer 16 includes a communication line 18 coupled to encoder 22. In the anticipated fabrication of a typical headend unit, a great number of program sources such as program sources 11 and 21 will be used each having their respective encoders, scramblers and channel modulators for placing the program information upon the cable system. Accordingly, a program source 31, an encoder 32, descrambler 33 and channel modulator 34 coupled to cable 15 represent these further numbers of program sources. By further similarity, address computer 16 includes a communication line 19 coupled to encoder 32.

In operation, program source 11 provides the program source material such as video and sound information suitable for presentation on television receiver 44. In accordance with conventional fabrication techniques, program source 11 further provides conventional horizontal and vertical scan synchronizing signals to form a composite video and sound signal which is applied to encoder 12. Address computer 16 produces a message packet of operational and control information which includes program authorization and which is described below in greater detail. Suffice it to note here that the message packet is particularly structured for the operation of the various decoders within the cable television system. In its preferred operation, address computer 16 provides this message packet to encoder 12 via a coupling line 17 such that encoder 12 and address computer 16 cooperate to insert the message packet within the vertical blanking interval of the signal provided by program source 11. Scrambler 13 includes conventional scrambling circuitry for altering the video signal from program source 11 and, in some instances, the scan synchronizing signals therein to produce scrambled program source signals which are not properly displayed upon a television without appropriate descrambling at the decoder. The type of scrambling performed by scrambler 13 is largely a matter of system design choice and may vary from relatively simple sync signal suppression and/or video inversion to more complex systems which provide random and pseudorandom scrambling techniques. In any event, the scrambled program source signal together with the inserted message packet during the vertical blanking interval is applied to a conventional channel modulator 14 which modulates the scrambled and encoded baseband signal from program source 11 upon a television carrier signal. This modulated carrier signal is then applied to output cable 15 for transmission to the distribution system (not shown) and ultimately to be received by the system decoders such as decoder 40.

As mentioned, a typical headend system provides a substantial number of television programs at different channel frequencies upon the cable system. Accordingly, program source 21, encoder 22 and scrambler 23 function in the same manner as program source 11, encoder 12 and scrambler 13 to provide a scrambled program source signal having the appropriate message packet inserted during the vertical blanking interval. Channel modulator 24 modulates this scrambled signal upon a carrier frequency different from channel modulator 14 and applies it to cable 15. Similarly, the remaining program sources such as program source 31 and their respective encoders and scramblers such as encoder 32 and scrambler 33 operate to provide additional scrambled program signals which are modulated upon individual carriers by their respective channel modulators such as modulator 34. Thus, through the operation of headend 10, cable 15 carries a plurality of program signals upon a corresponding plurality of channel frequencies which may be commonly applied to the many decoders within the cable television system.

Decoder 40 includes a front end 41 having a tuner, IF amplifier, and video detector all constructed in accordance with conventional fabrication techniques. A processor 45 is coupled to front end 41 by a channel select coupling 48. The output of the detector within front end 41 comprises the scrambled baseband video signal and inserted message packet produced at the headend which is coupled to a descrambler 42 by a coupling 55 and to processor 45 by a coupling 49. Processor 45 is further coupled to descrambler 42 by a coupling 57. A user input device 46 is coupled to processor 45 by a coupling 47. The output of descrambler 42 is coupled to a channel modulator 43 by a coupling 56 which in turn is coupled to a television receiver 44 by a coupling 58.

In operation, the tuner, IF and video detector within front end 41 function in accordance with conventional fabrication techniques to frequency select the desired program channel from cable system 15 and to recover the baseband video and sound signals therefrom. User input 46 may, for example, comprise a channel selection keyboard through which the user inputs the desired channel number. The channel number is communicated to processor 45 as a digitally encoded signal. Processor 45 then converts the input channel selection signal to an appropriate control signal which is applied to the tuner within front end 41 to select the desired program channel. As mentioned above, the baseband signal originally modulated upon the program channel frequency has usually been altered or scrambled. Accordingly, the baseband video and sound signal at the output of the video detector within front end 41 is correspondingly scrambled and, thus, generally not viewable on a conventional television receiver without first being restored to its original format. Thus, the output signal of the video detector within front end 41 is processed through a descrambler 42 which provides the necessary restoration of the baseband video and sound signal to its original program format which may then be utilized by a conventional television receiver. The operation of descrambler 42 is controlled by processor 45 in accordance with the operation set forth below in greater detail. Finally, the descrambled baseband video and sound signal is modulated upon a selected television carrier signal and applied to television receiver 44. In accordance with conventional cable system operation, modulator 43 is a fixed modulator operating at a single frequency such as channel three or channel four and, correspondingly, television receiver 44 remains set to receive the channel frequency of modulator 43. Thus, all channel selection by the viewer is implemented using decoder 40 rather than the channel selection apparatus of television receiver 44.

In further accordance with conventional cable television system operation, certain program channels are produced at headend 10 as part of the basic cable service and thus are intended to be received by all decoders and displayed on all television receivers. Such signals may be distributed without scrambling or may be continuously authorized by the inverted message used therein. Conversely, other program channels may be intended to be viewed only by those viewers who have paid additional service fees to receive such programs. These program channels are generally described as pay per view program channels and require that the user's decoder be authorized to receive and descramble the program information. In addition, the decoders within the cable system may be grouped or tiered through use of a market code identifier within the message packet. Headend unit 10 controls the market code grouping and the pay per view operation of each system decoder including decoder 40 in a process known as authorization. It should be recalled that the message packet is provided by address computer 16 to the encoders within the headend system for insertion into the program signal during the vertical blanking interval of the program signal. Correspondingly, processor 45 is operative to recover and examine the message packet within the vertical blanking interval to determine whether decoder 40 is within the intended market code group and, if so, is otherwise authorized to receive the particular program channel requested by the user. In the event decoder 40 is within the correct market code group and is otherwise authorized to receive the selected program channel, processor 45 produces an enabling signal which is coupled to descrambler 42 by coupling 57. In response, descrambler 42 is enabled and provides a reciprocal operation to that of the scrambling circuits within headend 10 to restore the baseband video signal to the standard format. Once descrambled, the baseband signal is then modulated by modulator 43 upon a carrier and processed for viewing by television receiver 44. If, however, decoder 40 is not within the intended market code group or is not authorized to receive the selected program channel, processor 45 will not enable descrambler 42 and the selected program is denied. Once authorization is denied, processor 45 operates to determine whether the viewer may be eligible to obtain authorization and thereby view the selected program channel. In order to instruct the viewer as to the manner in which authorization may be obtained or to advise the viewer that the selected program channel is not authorized, processor 45 implements the present invention barkering system. As is mentioned above, barkering is well known in cable television systems and basically involves switching the decoder to an alternate program channel upon which instructional or promotional information is presented.

It should be noted that in accordance with an important aspect of the present invention described below, processor 45 makes an initial determination of the match between the decoder market code and that within the message packet. If a match is found, the examination of the remainder of the message packet relating to the specific program is continued. If, on the other hand, the market codes do not match, no further examination for authorization is required since program access is denied for lack of correct market code. In accordance with an important aspect of the present invention set forth below, processor 45 may receive collateral information within the message packet and may respond thereto by preempting the market code match and thereby deny authorization directly.

Figure 2:
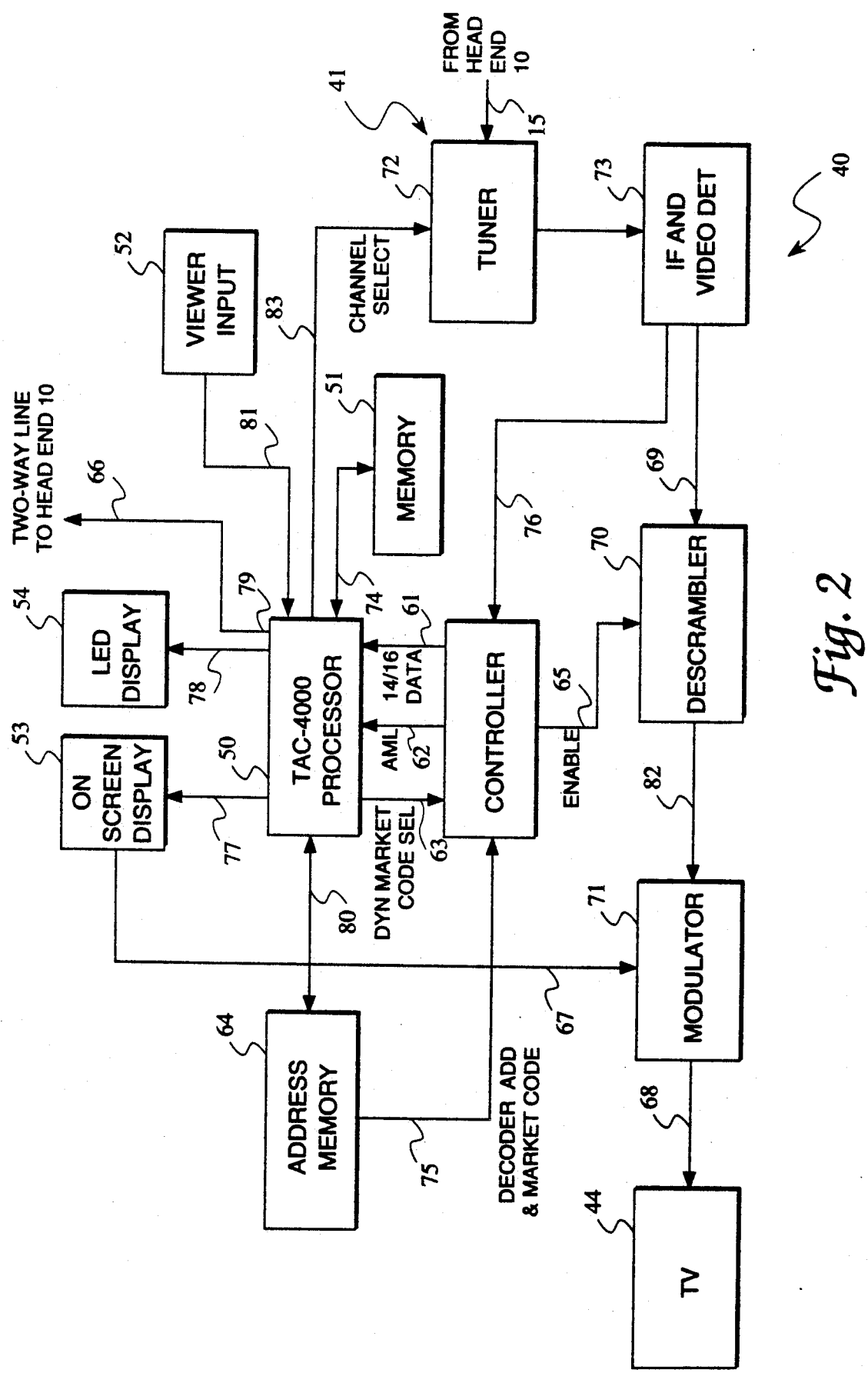
FIG. 2 sets forth a block diagram of a cable television decoder constructed in accordance with the present invention.

FIG. 2 sets forth a block diagram of decoder 40 together with a conventional television receiver 44. Decoder 40 includes a tuner 72 coupled to headend 10 (seen in FIG. 1) by a cable 15. An IF and video detector circuit 74 is coupled to tuner 72 to complete front end 41. Video output line 69 of IF and video detector 73 is coupled to a descrambler circuit 70 which in turn is coupled to a modulator 71 by a coupling 82. The output of modulator 71 is coupled to a conventional television receiver 44 by a connection 68. A controller 60 is coupled to the output of IF and video detector 73 by a coupling 76 and to descrambler circuit 70 by an output coupling 65. A processor 50 includes an associated memory 51 coupled to processor 50 by a bidirectional coupling 74. An address memory 64 is coupled to processor 50 by a bidirectional coupling 80 and is coupled to controller 60 by a coupling 75. Processor 50 is further coupled to controller 60 by an output line 63 and a pair of input lines 61 and 62. A viewer input circuit 52, which in its preferred form includes a channel input keyboard selection circuit, is coupled to processor 50 by a communication line 81. A two-way information channel 66 is coupled to output 79 of processor 50. It should be noted that while communication line 66 is shown separate from cable 15, it may in fact comprise an additional television communication channel frequency between processor 50 and headend 10 rather than an individual coupling. An LED display circuit 54 includes conventional LED display segments and driver systems therefor and is coupled to processor 50 by a coupling line 78. An on-screen display circuit 53, constructed in accordance with conventional fabrication techniques, is coupled to processor 50 by a coupling 77 and to modulator 71 by a coupling 67.

In operation, headend 10 (seen in FIG. 1) transmits a plurality of program channel signals via cable 15 which are received by tuner 72. Channel selection is initiated by viewer operation of input 52 to produce a channel selection signal which is applied to processor 50. In response, processor 50 produces a corresponding channel select signal which is coupled to tuner 72 by output 83 and which configures tuner 72 to frequency select the desired program channel from the plurality of program channels on cable 15. The selected program channel signal is processed by IF and video detector 73 to produce a baseband video and audio signal which is coupled to both controller 60 and descrambler 70. In addition, processor 50 produces the appropriate output signals for configuring LED display 54 to show the selected channel number originally applied by the viewer at viewer input 52. In some circumstances, processor 50 may also produce appropriate output information signals on line 77 which are used by on-screen display 53 to provide appropriate alphanumeric display characters on the screen of television receiver 44.

As mentioned above, the received program signal includes a message packet inserted into the program signal during the vertical blanking interval. Correspondingly, controller 60 is configured to recover the message packet from the baseband video signal. While the structure of the message packet transmitted during the vertical blanking interval is, to some extent, a matter of design choice, the present invention system utilizes a message packet which is inserted during the tenth through fifteenth horizontal scan lines of the vertical blanking interval. For convenience, these lines are referred to by their horizontal scan line numbers. Thus, the tenth horizontal scan line within the vertical blanking interval is referred to simply as "line 10" while the eleventh is "line 11" and so on. Within the message packet, each portion of the transmitted information occupies an established predictable line and line portion. As is also mentioned above, it has been found advantageous in the present invention system to configure the initial portion of the message packet (lines 10 through 13) to include the individual identifying address for decoder 40. The latter uniquely identifies decoder 40 among all the remaining decoders within the system. In addition, a program tag which identifies the program channel and a market code identifier which in turn establishes the group of decoders intended to respond to the program signal. Lines 14 and 1 provide certain other control and operational information which, in accordance with the present invention, are used by processor 50 in supplemental communication with the system headend in the manner described below.

Thus, once controller 60 has recovered the message packet from the recovered baseband signal controller 60 processes vertical blanking interval lines 10, 11, 12 and 13 while passing the data upon lines 14 and 15 directly to processor 50. Processor 50 examines the line 14 and 15 data to determine whether or not decoder 40 is subject to an additional tier of authorization apart from the stored program list within address memory 40. Concurrently, controller 60 examines the address information in lines 10, 11 and 12 of the vertical blanking interval packet and determines whether any of the three decoder addresses set forth therein match the stored decoder address within memory 64. If an address match occurs, controller 60 produces address match logic signals at line 62 which is applied to processor 50. Processor 50 receives the address match logic signal and utilizes the address comparison of controller 60 to implicitly determine whether or not the line 14 and 15 data is intended to apply to decoder 40. Thus, using implicit addressing for processor 50 avoids the need to separately determine addressing and conveniently establishes the important address comparison information for use by processor 50. In the event an address match does not occur, decoder 40 makes no further attempt to receive and respond to the vertical blanking interval data packet. If, however, an address match occurs, processor 50 utilizes the line 14 and 15 data to supply a dynamic market code selection signal to controller 60 via information line 63. It should be noted that controller 60 also uses the address match logic signal to indicate market code matches on line 13. Since processor 50 knows when it is allowing correct market matches to occur, it can use this information to detect the presence of data on a channel without interfering with the detection of individual addressing.

At this point, it should be noted that address memory 64 includes a plurality of stored market code numbers for use by controller 60 and processor 50. While the number of market codes used is a matter of design choice, it has been found advantageous in the present system to use four market code, the first of which is a static or default market code which remains unchanged by processor 50 while the remaining three may be altered dynamically by processor 50 in response to communications on data lines 14 and 15.

In the event the line 14 and 15 data indicates to processor 50 that no supplemental authorization or tiered information is applicable to decoder 40, processor 50 applies the "correct" market code selection signal (that is, the code corresponding to the message packet) to controller 60 and permits controller 60 to carry forward its determination of market code match and program authorization in its normal fashion. If, however, the line 14 and 15 data indicates to processor 50 that decoder 40 is not authorized to receive the selected program for reasons such as system tiering or the like, processor 50 forces a market code selection upon controller 60 which is incorrect and thereafter allows controller 60 to determine that a market code match is not present which in turn inhibits the descrambling of the selected program channel.

As a result, the ability of processor 50 to receive supplemental or additional information relating to authorization using data lines 14 and 15 and to intentionally impose an incorrect market code selection number upon controller 60, in essence, gives processor 50 a "veto" capability which can be used to defeat authorization of decoder 40 despite an actual decoder address and market code match between decoder 40 and the vertical blanking interval data signal of the selected program. This veto capability in response to the additional information on data lines 14 and 15 provides several advantages for the present invention system. For example, increased protection against theft is provided since any decoder can be individually and specifically targeted by the headend to be rendered inoperable once a theft is reported by simply using the line 14 and 15 data to provide a continuous force veto of its market code comparison. By way of further example, the use of supplemental information and market code veto permits tiered operation within the system and greater system flexibility. This flexibility is maximum because each decoder may be individually controlled.

Once the address match and market code examination is complete and a match is found, the program tag within the message packet is compared by controller 60 to the stored list of authorized programs within memory 64. In the event the program tag corresponds to an authorized program within the program list of memory 64, controller 60 produces an enabling signal on line 65 which activates descrambler 70 causing the scrambled video baseband signal from IF and detector 73 to be descrambled and returned to the conventional video baseband format. It should be recalled that descrambler 70 is required to essentially provide a complimentary or reciprocal action for the scrambler used within headend 10 (seen in FIG. 1). The output of descrambler 70 is coupled to modulator 71 and thereafter applied to television receiver 44 for display.

If, however, controller 60 determines that the program tag 10 of the program message packet does not correspond to an authorized program within the list of controller 60, processor 50 and controller 60 cooperate to determine the next action of decoder 40 based upon information within the message packet. For example, the program may be available for purchase on an individual or impulse pay per view basis or may be simply unavailable for this decoder. In either event, processor 50 determines decoder authorization level and immediately switches tuner 72 to receive the appropriate barkering channel from among a plurality of barkering channels at headend 10. Processor 50 also stores the original viewer input channel selection within memory 51 and retains the viewer selected channel number during the entire barkering and authorization process. Once barkering has commenced, the viewer is presented with the appropriate barker message upon television receiver 44 which provides the necessary information to the viewer.

Figure 3:
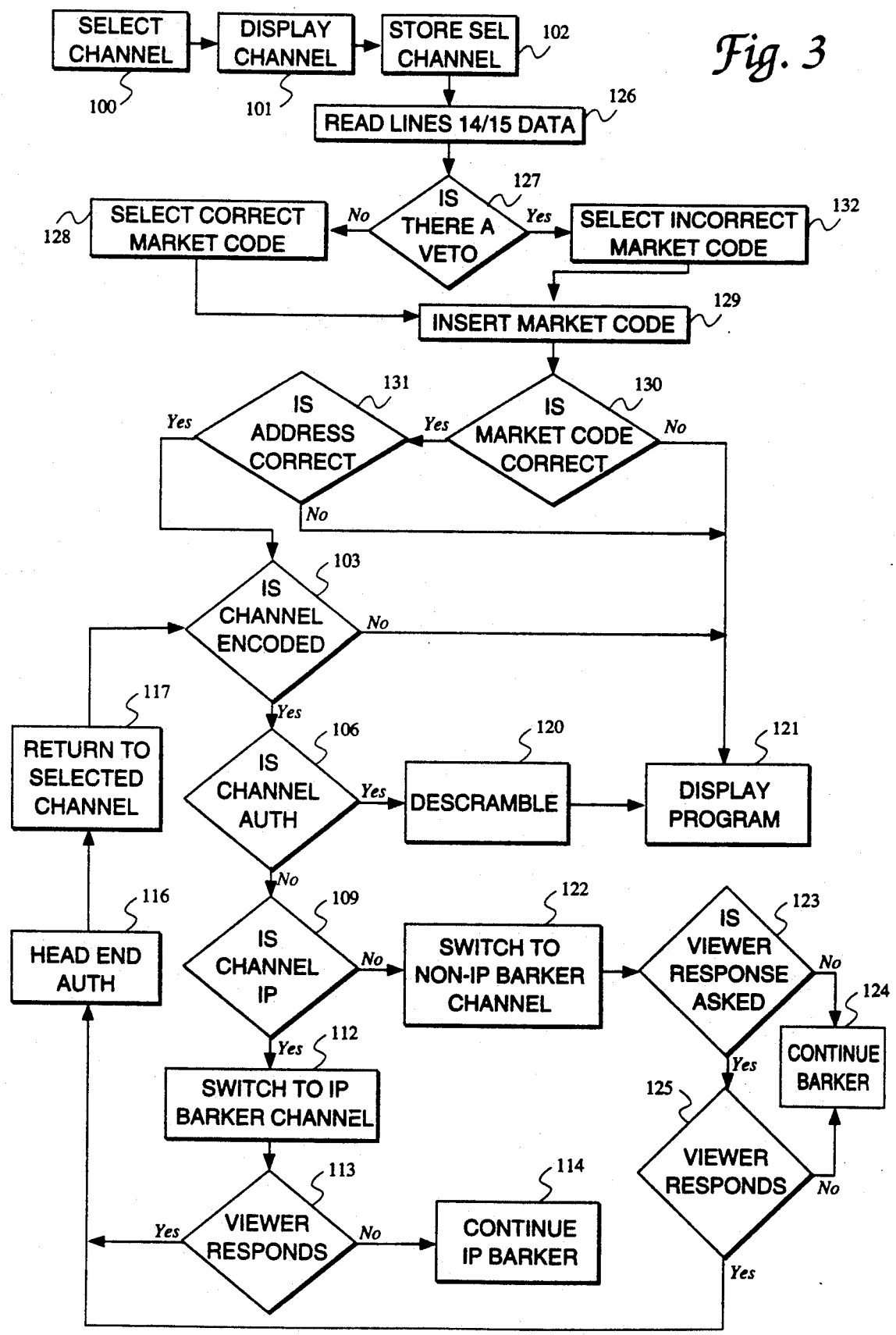
FIG. 3 sets forth a flow diagram of the operation of the decoder of FIG. 2 providing the present invention multiple barkering.

FIG. 3 sets forth a flow diagram for the operation of processor 50 and controller 60 in the present invention multiple barkering system. The process is initiated at a channel selection step 100 in which the viewer provides an input selection signal corresponding to the desired program channel. Thereafter, the system moves to a step 101 in which the selected program channel is displayed and thereafter to a step 102 in which the selected channel viewer input is stored within memory. The system next moves to a step 126 in which the information on data lines 14 and 15 is read by the system processor. Thereafter, the system moves to a step 127 in which a determination is made as to whether authorization is to be vetoed based upon line 14 and 15 data. In the event a veto is to be exercised, the system moves to a step 132 in which an incorrect 15 market code is force selected for the system controller. If no authorization veto is to be exercised, the system moves instead to a step 128 in which the correct market code is selected for use by the system controller. In either event, the system next moves from either step 128 or step 132 to a step 129 in which the selected market code is inserted and thereafter to a decision step 130 in which a determination is made as to whether the market code is correct. If it is determined at step 130 that the market code is incorrect, the system moves directly to step 121 and the program information is displayed upon the television in a scrambled form. If, however, the market code is determined at step 130 to be correct, the system moves to a step 131 in which a determination is made as to whether the decoder address is correct. If the decoder address is incorrect, the system moves directly to step 121 and displays the scrambled program signal. If, however, the decoder address is found correct at step 131, the system moves to a decision step 103 in which a determination is made as to whether the program channel is an encoded channel.

It should be noted that within certain cable television systems, some channels are provided in a non-encoded format which permits the system decoders to simply function as channel converters and process the selected signal directly for display upon the television receiver. Accordingly, in the event it is determined at step 103 that the selected channel is not an encoded channel, the system moves directly to step 121 in which the program is played upon the television receiver. If, however, the selected program is an encoded program channel, the system moves to a decision step 106 in which a determination is made as to whether the program channel is authorized for reception by the decoder. In the event the selected program channel is authorized, the system moves to a step 120 in which the previously scrambled program signal is descrambled and thereafter to step 121 in which the program information is displayed upon the television receiver.

If it is determined at step 106 that the selected program channel is not authorized for reception by the decoder, the system moves to a step 109 in which a determination is made as to whether program channel authorization may be obtained on an individual or impulse pay per view basis. If impulse pay per view is authorized or available, the system moves to a step 112 in which the decoder is switched to an impulse pay per view barker channel which causes the television receiver to display the appropriate information and instructions which permit the viewer to obtain authorization on an impulse pay per view basis. Thereafter, the system moves to a decision step 113 in which a determination is made as to whether the viewer responds to the barker channel information in the appropriate manner. In the event the viewer fails to properly respond, the system moves to a step 114 in which the impulse pay per view barker channel is continued. If, however, the viewer responds to indicate the desire to obtain impulse pay per view authorization, the system moves to a step 116 in which the authorization request is communicated to the headend portion of the cable system and the program channel is authorized. Thereafter, the system moves to step 117 in which the decoder is returned to the original viewer selected program channel. The system then returns to step 103 and a determination is made that the program channel is an encoded channel. The system then moves to step 106 in which a determination is made that the program channel is now authorized which results in the system moving to step 120 in which the program signal is descrambled afterwhich the system moves to step 121 and the selected program is displayed upon the television receiver.

Returning to step 109, in the event a determination is made at step 109 that the unauthorized channel is not available for authorization on an impulse pay per view basis, the system moves to a step 122 in which the decoder is switched to a nonimpulse pay per view barker channel which provides appropriate information and instruction to the viewer related to the viewer's selection of an unauthorized pay per view program channel which is not available on an impulse pay per view basis. The nature of the instruction available on the nonimpulse pay per view barker channel is subject to some variation. For example, the information on the barker channel provided at step 122 may be entirely promotional material which does not solicit a viewer response. Alternatively, the barker information may solicit a viewer response different from that solicited in the barker channel information at step 112. Thus, following step 122, the system determines at a step 123 whether a viewer response is solicited by the barker channel. If no viewer response is solicited, the system moves to step 124 and continues the promotional barker channel presentation. If, however, a viewer response is solicited and instructions are given for obtaining authorization on some basis other than the impulse pay per view basis, the system moves to step 125 in which the viewer response is determined. If the viewer does not respond, the system returns to step 124 and continues the barker presentation. If, however, the viewer responds appropriately, the system moves to step 116 in which authorization is provided at the system headend. Thereafter, the system carries forward the above-described process in which the decoder is returned to the originally selected program channel at step 117 and moves through steps 103 and 106 to determine the authorization of the selected program channel afterwhich the information is descrambled at step 120 and displayed at step 121.

What has been shown is a cable television system within which a decoder processor is operative to maintain an additional tiered response beyond the typical decoder authorization based upon decoder address and program tag information. The system uses the market code grouping capability of the system to permit the decoder processor to "veto" any decoder authorization of any targeted program. The veto information is provided to the processor using available lines within the vertical blanking interval message packet and is enforced by intentional insertion of an incorrect market code to the controller.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a television distribution system having a headend for providing a plurality of television signals within a plurality of program channels to a plurality of decoders, each having a stored decoder address, over a distribution network, market code means for dynamically controlling the authorization of a program channel for each decoder comprising:

means for inserting a data packet within one of said television signals which includes a decoder address, a market code, a primary program authorization and supplemental authorization data;

means for transmitting said television signal having said inserted data packet within a selected program channel to said plurality of decoders;

means for receiving said selected program channel at a receiving decoder and recovering said data packet;

means for processing said supplemental authorization data to determine whether authorization is to be defeated or determined in response to said decoder address, said market code and said primary program authorization;

means for imposing an incorrect market code solely in response to a determination by said means for processing that authorization is to be defeated; and means for authorizing said receiving decoder for said program channel if said decoder address, said market code and said primary program authorization are correct for said receiving decoder.

2. Market code means as set forth in claim 1 wherein said means for processing includes means for comparing said stored decoder address to said decoder address in said data packet and producing an address match signal when said addresses match.

3. Market code means as set forth in claim 2 wherein said means for processing includes means for receiving said address match signal and terminating said processing step in the absence of an address match signal.

4. Market code means as set forth in claim 3 wherein said means for authorizing includes means for storing a plurality of market codes within said decoder and wherein said means for imposing includes means for selecting one of said stored market codes to impose either a correct or incorrect market code.

5. Market code means as set forth in claim 4 wherein said means for processing includes means for dynamically changing selected ones of said stored market codes in response to said supplemental authorization data.

6. Market code means as set forth in claim 5 wherein at least one of said stored market codes is fixed and cannot be dynamically changed.

7. Market code means as set forth in claim 6 wherein said imposing means impose said fixed market code in the absence of said supplemental authorization data in said data packet.

8. Market code means as set forth in claim 7 wherein said means for processing and said means for authorizing are separate processors and wherein said means for processing relies upon said address match signal for decoder address confirmation.

9. Market code means as set forth in claim 7 wherein said means for inserting is operative during the vertical blanking interval of said one of said television signals.

10. Market code means as set forth in claim 9 wherein said means for transmitting includes means for scrambling at least a portion of said one of said television signals and wherein said means for authorizing includes means for descrambling said scrambled television signals once said receiving decoder is authorized.

11. In a television distribution system having a headend for providing a plurality of television signals within a plurality of program channels to a plurality of decoders, each having a stored decoder address, over a distribution network, a method of dynamically controlling the authorization of a program channel for each decoder comprising the steps of:

inserting a data packet within one of said television signals which includes a decoder address, a market code, a primary program authorization and supplemental authorization data;

transmitting said television signal having said inserted data packet within a selected program channel to said plurality of decoders;

receiving said selected program channel at a receiving decoder and recovering said data packet;

processing said supplemental authorization data to determine whether authorization is to be defeated or determined in response to said decoder address, said market code and said primary program authorization;

imposing an incorrect market code solely in response to a determination in said processing step that authorization is to be defeated; and authorizing said receiving decoder for said program channel if said decoder address, said market code and said primary program authorization are correct for said receiving decoder.

12. The method set forth in claim 11 wherein said processing step includes the step of comparing said stored decoder address to said decoder address in said data packet and producing an address match signal when said addresses match.

13. The method set forth in claim 12 wherein said processing step includes the step of receiving said address match signal and terminating said processing step in the absence of an address match signal.

14. The method set forth in claim 13 wherein said authorizing step includes the step of storing a plurality of market codes within said decoder and wherein said imposing step includes selecting one of said stored market codes to impose either a correct or incorrect market code.

15. The method set forth in claim 14 wherein said processing step includes the step of dynamically changing selected ones of said stored market codes in response to said supplemental authorization data.

16. The method set forth in claim 15 wherein at least one of said stored market codes is fixed and cannot be dynamically changed.

17. The method set forth in claim 16 wherein said fixed market code is imposed in the absence of said supplemental authorization data in said data packet.

18. The method set forth in claim 17 wherein said processing step and said authorizing step are performed in separate processors and wherein the processor performing said processing step relies upon said address match signal for decoder address confirmation.

19. The method set forth in claim 17 wherein said inserting step is performed during the vertical blanking interval of said one of said television signals.

20. The method set forth in claim 19 wherein said transmitting step includes the step of scrambling at least a portion of said one of said television signals and wherein said authorizing step includes the step of descrambling said scrambled television signals once said receiving decoder is authorized.

* * * * *